United States Patent [19]

Gardner et al.

[11] 4,348,917

[45] Sep. 14, 1982

[54] CONTROL MECHANISM WITH ADJUSTABLE FLOATING CAM

[75] Inventors: Frank H. Gardner, Hudson; Carl E. Kittle, Cedar Falls, both of Iowa

[73] Assignee: Deere & Company, Moline, Ill.

[21] Appl. No.: 191,643

[22] Filed: Sep. 26, 1980

[51] Int. Cl.³ .............................................. F16H 53/00
[52] U.S. Cl. .................................. 74/568 R; 251/234; 251/251
[58] Field of Search ............. 74/107, 568 R; 251/234, 251/251; 137/636.1

[56] References Cited

U.S. PATENT DOCUMENTS

| | | | |
|---|---|---|---|
| 403,169 | 5/1889 | Woodmansee | 74/568 |
| 443,463 | 12/1890 | Sechrist | 74/568 |
| 1,058,102 | 4/1913 | Ricketts | 251/234 |
| 1,492,492 | 4/1924 | Talbot | 74/568 |
| 3,126,829 | 3/1964 | Harbison et al. | 74/568 |

FOREIGN PATENT DOCUMENTS

| | | | |
|---|---|---|---|
| 730270 | 1/1943 | Fed. Rep. of Germany | 137/636.1 |
| 936622 | 12/1955 | Fed. Rep. of Germany | 74/568 |
| 2536093 | 9/1976 | Fed. Rep. of Germany | 251/251 |

*Primary Examiner*—Lawrence J. Staab
*Attorney, Agent, or Firm*—Henderson & Sturm

[57] ABSTRACT

The disclosure is of a control mechanism including a rockshaft carried by a support and itself having fixed thereto an upstanding rocker element. A cam is disposed alongside the rocker element, having a lower end formed with an opening that loosely embraces the rockshaft so as to enable relative movement of the cam within at least the limits of the opening. Lost-motion means interconnects the rocker element and cam for rocking of the two in unison about the rockshaft axis while permitting the aforesaid limited movement. Adjusting means is provided between the cam and rocker element for achieving adjustment of the cam relative to the rocker element while retaining the floatability or relative movement of the cam.

3 Claims, 2 Drawing Figures

CONTROL MECHANISM WITH ADJUSTABLE FLOATING CAM

BACKGROUND OF THE INVENTION

It is known in the prior art to utilize rockshaft-mounted cams with provision for adjustment of the cams. One example is the control of a pair of side-by-side poppet valves in hydraulic mechanism, where rocking of the rockshaft and cams performs selective opening and closing of the valves. In such prior arrangement, the cam is adjustable only by relative rocking thereof with respect to the rocker element, so that such adjustment is confined to angular adjustment. Because the cam is relatively tightly journaled on the rockshaft, it cannot float during rocking. This requires precise machining of the cam faces to compensate for the relationship between the cam face and the follower on the poppet valve. Often, proper adjustment of the cam relative to one poppet valve adversely affects the relationship of the cam to the other valve. These disadvantages are eliminated, according to the present invention, by means enabling limited floating of the cam relative to the rockshaft and rocker element. This means involves a loose mounting of the cam on the rockshaft plus lost-motion means enabling the cam to move angularly with the rocker element about the rockshaft axis while permitting limited movement of the cam generally lengthwise of the rocker element. In a preferred embodiment, the lower end of the cam has an opening which loosely embraces the rockshaft so as to permit shifting of the cam relative to the rockshaft within the limits established by the excess of the diameter of the opening over that of the rockshaft. The lost-motion means includes a pin and slot connection spaced from the rockshaft which guides the cam back and forth in one direction radially of the rockshaft while enabling the cam to rock about the pin within the aforesaid limits. The adjustment means accomplishes adjustment of the cam relative to the rocker element within at least the aforesaid limits and within the futher limits established by the pin and slot connection.

Further features and advantages of the invention will become apparent to those versed in the art as a preferred embodiment of the invention is disclosed in detail in the following description and accompanying drawings.

DESCRIPTION OF THE PREFERRED EMBODIMENT

In the following description, the parts will be referred to as occupying certain positions relative to each other; e.g., horizontal, upper, lower, etc. Similar expressions will be used in the claims but solely for ease of description and clarity and not by way of limiting the invention to the precise orientation disclosed.

Figure 1:
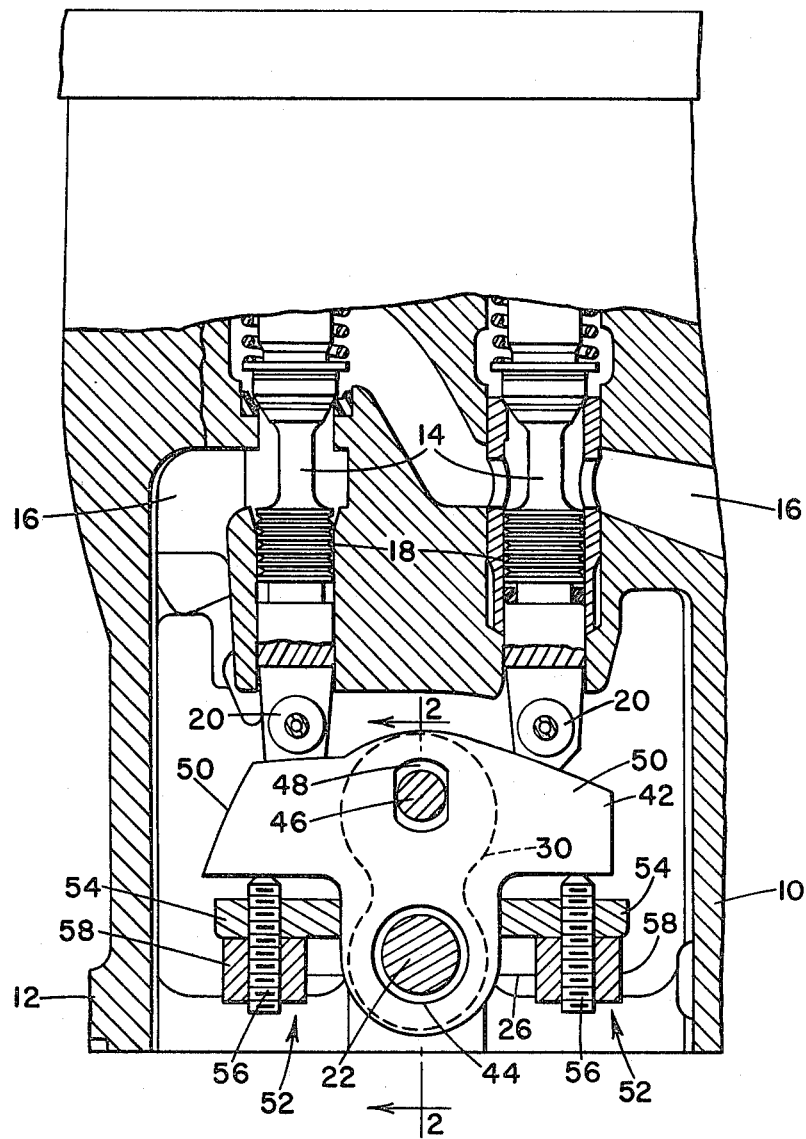
FIG. 1 is a fragmentary, partial section of a typical control mechanism involving the invention.

The drawings depict a typical installation in the form of a housing or support 10 having a lower portion or base 12 which may be affixed to any appropriate mounting. At an upper portion thereof, the housing carries two pairs of poppet valves 14 of which one pair is shown in FIG. 1. The poppet valves 14 selectively control a plurality of hydraulic fluid passages 16, not per se important here. Each valve slides independently of the other in its own vertical bore 18, and each valve depends below an intermediate interior portion of the housing 10 to a cam follower or roller 20.

Figure 2:
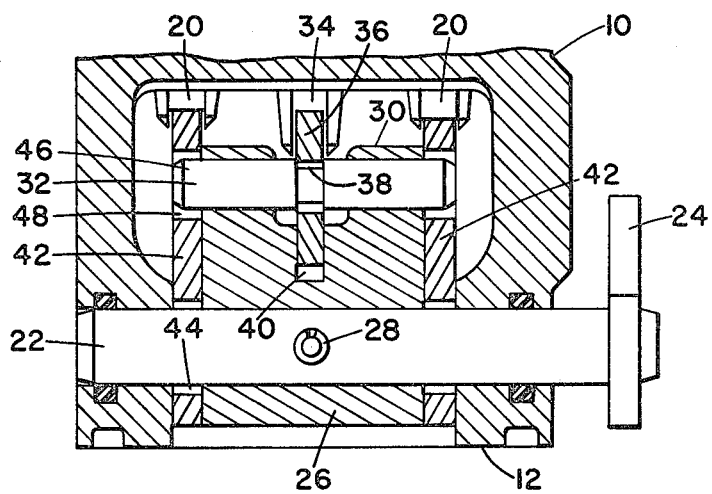
FIG. 2 is a section taken on the line 2—2 of FIG. 1.

For the purpose of selectively opening and closing the valves, the housing carries a rockshaft 22, here disposed on a horizontal axis below and spaced intermediate the valve bores 18. This rockshaft may be rockably carried in the housing in any suitable manner, one form being suggested in FIG. 2. An operating arm or lever 24 is fixed to the projecting end of the rockshaft. A rocker element 26 is fixed to the rockshaft, as by a cross pin 28 (FIG. 2), and this rocker has an upstanding arm 30 which, when both valves are closed, occupies a neutral position (FIG. 1) substantially centrally between and below the valve rollers 20. In this particular embodiment of the disclosure, the upper end portion of the arm 30 is bifurcated and receives a transverse pin or slot follower 32. Between the furcations of the arm is a detent 34 which cooperates with a pin-carried plate-like member 36 which serves to releasably retain the rocker element in its central or neutral position. Detents of this general nature are well known and form no part of the present invention. One feature, however, is that the detent plate serves also to retain the slot follower pin in place; i.e., against axial movement out of the rocker element, because the plate fits slots 38 and 40 respectively in the pin and rocker element.

Also associated with the rockshaft and rocker element are two cams 42, one alongside of each of the opposite sides of the rocker element arm. Since these are similar, only one will be described in detail. The central portion of the cam is elongated in the same direction as the length of the rocker element arm 30 so as to form a leg, the lower end portion of which is provided with an opening 44 of a diameter somewhat greater than that of the rockshaft. This enables limited movement of the cam bodily relative to the rockshaft and rocker element, at least within the limits established by the difference in diameters. To this extent, then, the cam can float with respect to the rocker element and rockshaft.

Nevertheless, since the cam must rock with the rockshaft and rocker element, some means must be utilized to establish a connection between the two. Part of this connection is provided by an axial projection 46 at the end of the cross pin 32 and part is created by a slot 48 in the upper end portion of the cam, which slot receives the pin end to form a lost-motion means between the cam and rocker element. As best seen in FIG. 1, the slot is elongated in the direction of the length of the rocker arm 30 but rather closely fits the pin in the horizontal direction transverse to this length. This relationship confines the float at the top end of the cam primarily to up and down along the rocker arm but prevents crosswise shifting of the top of the cam. Since the pin and slot at 46-48 forms a movable pivot connection, the lower part of the cam may shift horizontally and substantially diametrically relative to the rockshaft within at least the limits established by the diameter of the cam opening 44. In short, although the cam and rocker rock in unison about the rockshaft axis, the cam does partake of limited float.

Because there are the two valves to be controlled, the cam is shaped to accommodate this, being of generally T-shape, its central part forming a leg from the upper end of which right and left arms 50 project respectively in opposite lateral directions, being generally coplanar in a plane normal to the rockshaft axis. The top edge of each arm is shaped in such manner that, when the cam is rocked, say, clockwise about the rockshaft axis, that edge engages the adjacent roller and moves the left-hand valve upwardly or in an opening direction. The other cam edge, of course, moves away from the other valve, leaving that valve seated or closed. In addition to the pin and slot connection 46–48, the rocker element and cam are related by a pair of adjusting devices 52 which together provide adjustment means between the two elements. The rocker element is generally in the form of an inverted "T", having the upright arm previously described and a pair of opposite wings 54 projecting laterally outwardly respectively below the cam arms 50. Each adjusting device includes an adjusting screw 56 and lock nut 58, the use and operation of which will be obvious without further description. When the cam is properly adjusted, the rollers should just clear the top edges of the cam arms 50 without holding the valves open when the mechanism is in neutral. The interconnection between the cam and rocker is such as to maintain the proper line of force between the cam edge and its associated valve roller when the cam is rocked; i.e., the line of force should be directed toward the rockshaft axis when the cam is in neutral so that a straight-line force is applied to the valve when the cam is rocked. The ability of the cam to float results in a more accurate operation in opening and closing the valves. The design is simple and inexpensive and uses many parts common to at least one known prior construction.

Features and advantages other than those noted above will have become apparent to those versed in the art, as will changes in the preferred embodiment, all without departing from the spirit and scope of the invention.

We claim:

1. Control mechanism comprising a support, a rockshaft carried by the support for rocking about a horizontal axis, a rocker element having an arm including a lower end portion fixed to the rockshaft and rising therefrom to an upper end portion, a cam element disposed lengthwise and alongside of the arm and having a lower end portion provided with an opening loosely receiving the rockshaft so as to enable movement of the cam element relative to and both lengthwise and crosswise of the rocker element arm, and a connection between the elements for effecting rocking thereof in unison and including lost-motion means for limiting lengthwise relative movement of the cam element, said lost-motion means including a pivot spaced vertically from the rockshaft axis and about which the lower end portion of the cam element may swing relative to the rocker arm element within the limits of said opening.

2. Control mechanism comprising a support, a rockshaft carried by the support for rocking about a horizontal axis, a rocker element having a lower end portion fixed to the rockshaft, an arm rigid with and rising from said lower end portion to an upper end portion and a pair of wings rigid with said lower portion and extending respectively laterally outward from the rockshaft axis, a cam element disposed alongside the rocker element and having a lower end portion provided with an opening receiving the rockshaft from at least above, said opening being elongated lengthwise of the arm to enable movement of the cam element relative to and lengthwise of the rocker element, said cam being of generally T-shape and having a leg lying alongside the rocker element arm and opposite arms extending respectively laterally outwardly and spaced respectively above the rocker element wings, a connection between the elements for effecting rocking of the elements in unison and including lost-motion means for limiting lengthwise relative movement of the cam element, and adjusting means including a pair of adjusting devices respectively cooperative between the wings and arms.

3. The control mechanism of claim 2 wherein the lost-motion means is a slot in one element and a slot follower on the other element, said slot being elongated in the direction of the length of the rocker element arm but fitting the follower closely in both directions of the crosswise of the length of said rocker element arm.

* * * * *